United States Patent
Yan et al.

(10) Patent No.: US 11,194,569 B2
(45) Date of Patent: Dec. 7, 2021

(54) METHOD, ELECTRONIC DEVICE AND MEDIUM FOR UPGRADING A HYPER-CONVERGED INFRASTRUCTURE NODE

(71) Applicant: EMC IP Holding Company LLC, Hopkinton, MA (US)

(72) Inventors: Biao Yan, Jinjiang Zone (CN); Haina Yan, Nanjing (CN); Wenjing Li, Jixi (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/597,560

(22) Filed: Oct. 9, 2019

(65) Prior Publication Data

US 2020/0133657 A1   Apr. 30, 2020

(30) Foreign Application Priority Data

Oct. 31, 2018   (CN) .......................... 201811288903.9

(51) Int. Cl.
*G06F 8/658* (2018.01)
*G06F 8/61* (2018.01)
*G06F 3/06* (2006.01)

(52) U.S. Cl.
CPC .............. *G06F 8/658* (2018.02); *G06F 3/064* (2013.01); *G06F 3/067* (2013.01); *G06F 8/61* (2013.01); *G06F 8/63* (2013.01)

(58) Field of Classification Search
CPC .... G06F 8/60–66; G06F 3/0614; G06F 3/064; G06F 3/0604; G06F 3/0632;

(Continued)

(56) References Cited

U.S. PATENT DOCUMENTS 6,192,518 B1 * 2/2001 Neal ....................... G06F 8/658
717/175
7,472,254 B2 * 12/2008 Collins ............... G06F 16/1787
711/220

(Continued)

OTHER PUBLICATIONS

Sameteladze, N., Delta Encoding Based Methods to Reducte the Size of Smartphone Application Updates, Graduate These and Dissertations, University of South Florida [online], 2013 [retrieved Oct. 28, 2020], Retrieved from Internet: <URL: https://scholarcommons.usf.edu/etd/4573/>, whole document.*

*Primary Examiner* — Todd Aguilera
(74) *Attorney, Agent, or Firm* — BainwoodHuang (57) ABSTRACT

Storage management techniques involve: generating, based on a first file created at a first time, a first package including first file information, information regarding a physical location of the first file and a first block associated with the first file; generating an upgrade package from a second package based on the first package, the second package based on a second file created at a second time prior to the first time, the second package including second file information, information regarding a physical location of the second file and a second block associated with the second file; and transmitting the upgrade package to an HCI system node for upgrade. The techniques may also include upgrading the node based on the upgrade package and the second block. Accordingly, installation time is saved, the normal operation of the node is ensured and the influence over other nodes is reduced.

22 Claims, 7 Drawing Sheets

(58) Field of Classification Search
CPC ....... G06F 3/0659; G06F 21/31; H04L 67/06; H04L 67/1097; H04L 67/34; H04L 41/08–0836
See application file for complete search history.

(56) References Cited

U.S. PATENT DOCUMENTS

| | | | |
|---|---|---|---|
| 8,005,929 B1 * | 8/2011 | Okhotski | G06F 8/65 |
| | | | 709/220 |
| 8,032,498 B1 * | 10/2011 | Armangau | G06F 16/128 |
| | | | 707/690 |
| 9,535,688 B2 * | 1/2017 | Dani | G06F 8/65 |
| 10,193,752 B2 | 1/2019 | Rao et al. | |
| 10,263,844 B1 | 4/2019 | Wu et al. | |
| 10,416,986 B2 * | 9/2019 | Mukhopadhyay | G06F 21/57 |
| 10,489,138 B1 | 11/2019 | Wu et al. | |
| 10,649,764 B2 | 5/2020 | Kulakovsky et al. | |
| 10,802,815 B1 | 10/2020 | Wang et al. | |
| 10,817,279 B1 | 10/2020 | Wang et al. | |
| 10,852,946 B1 | 12/2020 | Ozmen et al. | |
| 10,871,960 B2 | 12/2020 | Bashi et al. | |
| 2005/0080823 A1 * | 4/2005 | Collins | G06F 16/1787 |
| 2013/0080720 A1 * | 3/2013 | Nakamura | G06F 16/128 |
| | | | 711/161 |
| 2016/0026452 A1 * | 1/2016 | Dani | G06F 8/65 |
| | | | 717/170 |
| 2019/0026095 A1 * | 1/2019 | Mukhopadhyay | G06F 21/57 |

\* cited by examiner

METHOD, ELECTRONIC DEVICE AND MEDIUM FOR UPGRADING A HYPER-CONVERGED INFRASTRUCTURE NODE

CROSS-REFERENCE TO RELATED APPLICATION(S)

This application claims priority to Chinese Patent Application No. CN201811288903.9, on file at the China National Intellectual Property Administration (CNIPA), having a filing date of Oct. 31, 2018, and having "METHOD, ELECTRONIC DEVICE AND COMPUTER READABLE STORAGE MEDIUM OF STORAGE MANAGEMENT" as a title, the contents and teachings of which are herein incorporated by reference in their entirety.

FIELD

The present disclosure relates to the computer field, and more specifically, to a method, electronic device and computer-readable storage medium of storage management.

BACKGROUND

A hyper-converged infrastructure (HCI) means that the same set of unit devices (also known as a node) not only include resources and technologies, such as computation, network, storage and server virtualization and the like, but also include backup software, snapshot, deduplication and on-line data compression among other elements. However, multiple sets of unit devices (i.e., a plurality of nodes) can be aggregated via a network to implement modular seamless horizontal expansion and form a uniform resource pool. A HCI system integrates the virtualized computation and storage into the same system platform. In brief, virtualized software operates on a physical server and distributed storage services run on the virtualized software for use by a virtual machine. Therefore, an upgrade of storage services on the respective nodes has attracted much attention.

SUMMARY

Embodiments of the present disclosure provide a solution of storage management.

In accordance with a first aspect of the present disclosure, there is provided a method of storage management. The method includes: generating, based on a first installation file created at a first point of time, a first installation file package including at least information describing the first installation file, information regarding a physical storage location of the first installation file and a first data block associated with the first installation file; generating an upgrade installation package from a second installation file package based on the first installation file package, the second installation file package being generated based on a second installation file created at a second point of time prior to the first point of time, and the second installation file package including at least information describing the second installation file, information regarding a physical storage location of the second installation file and a second data block associated with the second installation file; and transmitting the upgrade installation package to a node of a HCI system for upgrade.

In accordance with a second aspect of the present disclosure, there is provided a method of storage management. The method includes: receiving, at a node of a HCI system, an upgrade installation package generated from a second installation file package based on a first installation file package, the first installation file package being generated based on a first installation file created at a first point of time and including at least information describing the first installation file, information regarding a physical storage location of the first installation file, and a first data block associated with the first installation file, and the second installation file package being generated based on a second installation file created at a second point of time prior to the first point of time and including at least information describing the second installation file, information regarding a physical storage location of the second installation file, and a second data block associated with the second installation file; acquiring the second data block previously stored on the node; and upgrading the node based on the received upgrade installation package and the acquired second data block.

In accordance with a third aspect of the present disclosure, there is provided an electronic device. The electronic device includes: at least one processor; a memory coupled to the at least one processor and having instructions stored thereon, the instructions, when executed by the at least one processor, causing the device to perform acts including: generating, based on a first installation file created at a first point of time, a first installation file package including at least information describing the first installation file, information regarding a physical storage location of the first installation file and a first data block associated with the first installation file; generating an upgrade installation package from a second installation file package based on the first installation file package, the second installation file package being generated based on a second installation file created at a second point of time prior to the first point of time, and the second installation file package including at least information describing the second installation file, information regarding a physical storage location of the second installation file and a second data block associated with the second installation file; and transmitting the upgrade installation package to a node of a HCI system for upgrade.

In accordance with a fourth aspect of the present disclosure, there is provided an electronic device. The electronic device includes: at least one processor; a memory coupled to the at least one processor and having instructions stored thereon, the instructions, when executed by the at least one processor, causing the device to perform acts including: receiving, at a node of a HCI system, an upgrade installation package generated from a second installation file package based on a first installation file package, the first installation file package being generated based on a first installation file created at a first point of time and including at least information describing the first installation file, information regarding a physical storage location of the first installation file, and a first data block associated with the first installation file, and the second installation file package being generated based on a second installation file created at a second point of time prior to the first point of time and including at least information describing the second installation file, information regarding a physical storage location of the second installation file, and a second data block associated with the second installation file; acquiring the second data block previously stored on the node; and upgrading the node based on the received upgrade installation package and the acquired second data block.

A fifth aspect of the present disclosure provides a computer-readable storage medium. The computer-readable storage medium has computer-readable program instructions stored thereon which, when executed by a processing unit, cause the processing unit to perform the method according to the first aspect of the present disclosure.

A sixth aspect of the present disclosure provides a computer-readable storage medium. The computer-readable storage medium has computer-readable program instructions stored thereon which, when executed by a processing unit, cause the processing unit to perform the method according to the second aspect of the present disclosure.

It should be appreciated that the Summary is not intended to identify key or essential features of the embodiments of the present disclosure, or limit the scope of the present disclosure. Other features of the present disclosure will be understood more easily through the following description.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure. In the drawings.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more details below with reference to the drawings. Although the drawings illustrate some embodiments of the present disclosure, it should be appreciated that the present disclosure can be implemented in various manners and should not be interpreted as being limited to the embodiments explained herein. On the contrary, the embodiments are provided to understand the present disclosure in a more thorough and complete way. It should be appreciated that drawings and embodiments of the present disclosure are provided only for the purpose of examples rather than restricting the protection scope of the present disclosure.

In description of the embodiments of the present disclosure, the term "includes" used herein and its variants are to be read as open-ended terms that mean "includes, but is not limited to." The term "based on" is to be read as "based at least in part on." The term "one embodiment" is to be read as "at least one embodiment." The following text also can include other explicit and implicit meanings.

Figure 1:
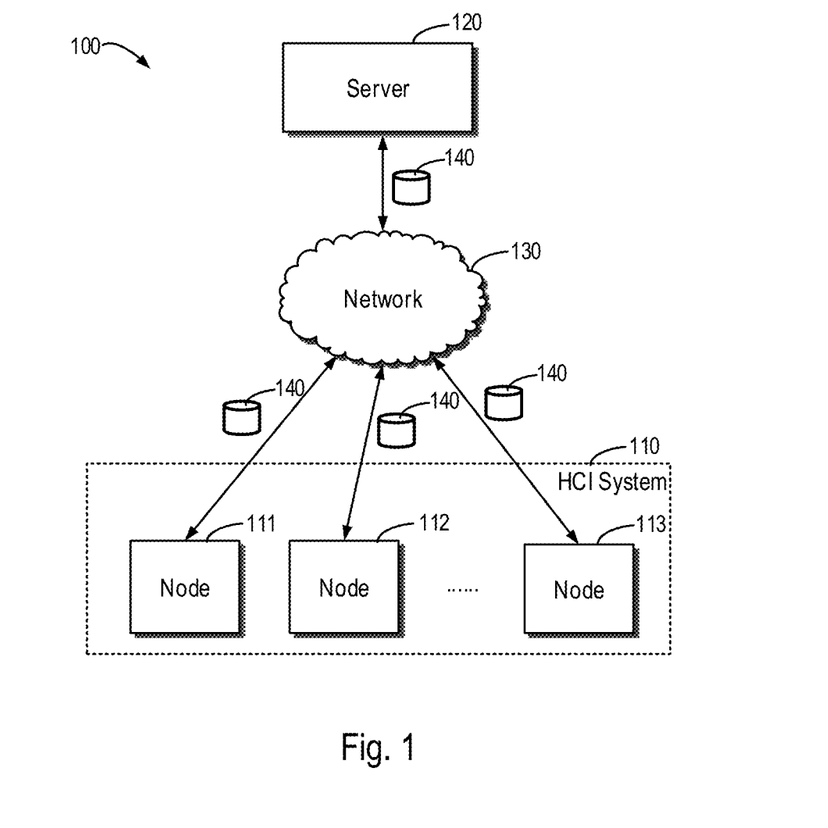
FIG. 1 illustrates a schematic diagram of an example application scenario where embodiments of the present disclosure can be implemented.

FIG. 1 illustrates a schematic diagram 100 of an example application scenario where embodiments of the present disclosure can be implemented. As shown in FIG. 1, a HCI system 110 can include a plurality of nodes 111, 112 and 113, each node at least having both computing and storage capabilities. For example, the nodes 111, 112 and 113 respectively can at least include a central processing unit (CPU) and a storage (not shown). The nodes 111, 112 and 113 can have the same component and structure. However, it should be understood that the nodes 111, 112 and 113 also can have different components and structures in other possible scenarios. Moreover, it should be appreciated that although it is illustrated in FIG. 1 that the HCI system 110 includes three nodes 111, 112 and 113, the HCI system 110 also can include more or fewer nodes in other possible scenarios. HCI application software can integrate the resources of the computing nodes 111, 112 and 113 across each of the nodes and provide computing and storage services for the user applications (not shown) of the HCI system 100.

A server 120 can communicate, via a network 130, with the respective nodes 111, 112 and 113 in the HCI system 100. The network 130 can be, for example, a storage area network (SAN) or any other suitable types of networks. The server 120 can provide computing and storage control services for the respective nodes 111, 112 and 113, such as an installation and upgrade for the HCI application software (such as software for storage control). The server 120 can transmit an upgrade installation package 140 consisting of a new version of the installation file to the respective nodes 111, 112 and 113 for upgrade.

A traditional solution mainly includes two upgrade ways: a fresh installation and a non-disruptive upgrade (NDU). The fresh installation firstly cleans up the installation file to be upgraded on the respective nodes and then loads the new installation file to the nodes for upgrade. During this procedure, the services on the nodes should be ceased. If the upgrade fails, the nodes also cannot continue to work. To some extent, the NDU can solve this type of issue because it is more like a patch operation. The services running on the nodes to be upgraded can be migrated to other nodes during the NDU procedure, which will not affect the consistency of the services. But this operation also has flaws: the nodes in the middle of upgrade need to switch over the services to other nodes, which will cause excessive workload of other nodes during the upgrade. In addition, when the upgrade fails, the nodes to be upgraded cannot continue to work either.

In the above two ways, the server 120 loads the entire new installation file to the respective nodes 111, 112 and 113, which is quite time-consuming and occupies a lot of extra space on the nodes. Besides, neither of the above two ways can change the software to a previous version. Furthermore, although the services are not interrupted in the NDU, the stress for other nodes to which the services are migrated will last for a long time.

In view of this, the concept of the embodiments of the present disclosure is to provide an improved solution of storage management to overcome the issues in the above upgrade. In this solution, instead of the entire new version of the installation file (also known as "first installation file"), only incremental data of the installation file relative to the previous version of the installation file (also known as "second installation file") are loaded to the nodes. In this way, the installation time and the occupied space on the nodes can be saved. In addition, because the previous version of the software is conserved on the nodes, the software can be changed to the previous version as needed.

In accordance with embodiments of the present disclosure, the above solution can be implemented by using the incremental data at the level of data block. Such implementation can depend on hierarchical management of the data and will be described in details below with reference to FIG. 2, which illustrates a schematic diagram 200 of data hierarchical management in accordance with embodiments of the present disclosure. The hierarchical management is suitable for data management on the respective nodes 111-113 and the server 120 of the HCI system 110 in FIG. 1, such as management of installation files.

Figure 2:
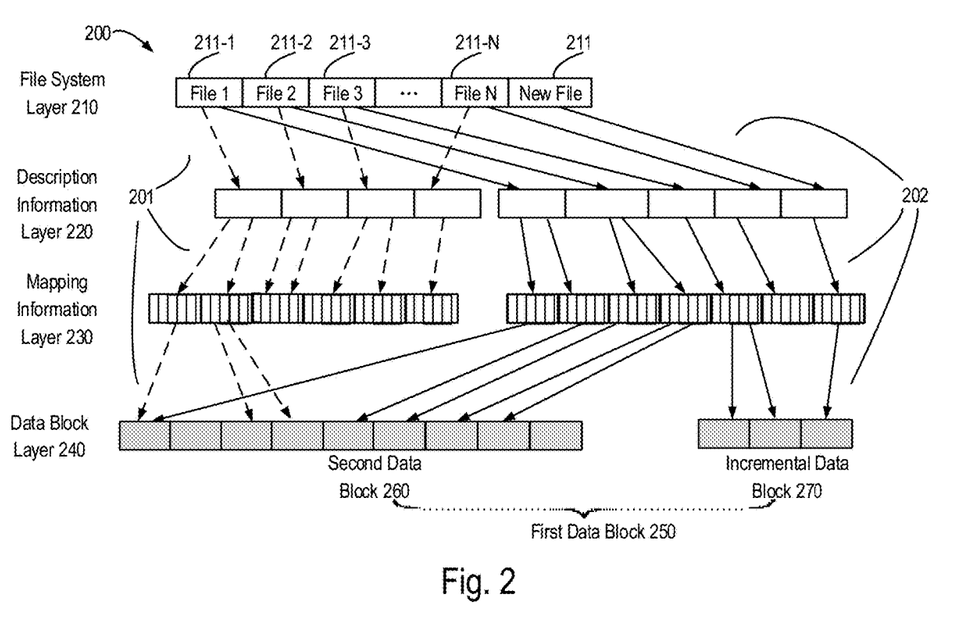
FIG. 2 illustrates a schematic diagram of data hierarchical management in accordance with embodiments of the present disclosure.

According to FIG. 2, a file system layer 210 can correspond to a plurality of files in a user space, e.g., previous files 211-1, 211-2, . . . , 211-N and a new file 211. For the plurality of files in the file system layer 210, the operating environment of the server 120 and the nodes 111-113 can be viewed, in accordance with embodiments of the present disclosure, as a three-layer structure: a description information layer 220, a mapping information layer 230 and a data block layer 240. The descriptive information layer 220 is used for constructing a logical space of all files in the file system layer 210 to indicate information describing the respective files, e.g., a creation time, size, version information, logical storage location (also known as logical address) of a file etc. In accordance with embodiments of the present disclosure, the logical storage location can indicate locations associated with the respective files on the mapping information layer 230. It should be understood that apart from the above listed items, the information describing the files also can include any other suitable information. The present application is not restricted in this regard.

The mapping information layer 230 can be provided for storing information associated with physical storage locations of data blocks corresponding to the respective files on a storage disk, so as to indicate the physical storage locations. The data block layer 240 is used for storage of the data blocks corresponding to the respective files. In accordance with embodiments of the present disclosure, the data block layer 240 can store all data corresponding to different installed versions (i.e., different versions of installation file). In accordance with embodiments of the present disclosure, the data blocks corresponding to the respective files can include a plurality of portions corresponding to storage units on the storage disk.

In accordance with embodiments of the present disclosure, each version can have corresponding description information (also known as information describing the installation file) and mapping information (also known as information regarding the physical storage location of the installation file) in the description information layer 220 and the mapping information layer 230, but share the same data blocks in the data block layer 240. In accordance with embodiments of the present disclosure, a corresponding installation file package can be formed for each version of the installation file, wherein the installation file package can include the information describing the installation file, the information regarding the physical storage location of the installation file and data blocks associated with the installation file respectively corresponding to the description information layer 220, the mapping information layer 230 and the data block layer 240.

In accordance with embodiments of the present disclosure, data blocks (such as the second data block 260 shown in FIG. 2) associated with the previous version of the installation file (second installation file) can act as the basic data blocks and an incremental data block 270 relative to the basis data blocks is generated for the current version of the installation file (first installation file). The first data block 250 associated with the first installation file in fact is a sum of the second data block 260 and the incremental data block 270. In accordance with some embodiments of the present disclosure, the basic data blocks can be initial data blocks corresponding to the initial version of the installation file when the installation is initialized. In accordance with alternative embodiments of the present disclosure, current data blocks corresponding to the upgraded installation file after each upgrade can act as the basic data blocks for next upgrade. It is certain that the basic data blocks also can be data blocks corresponding to any specified version of the installation file in other alternative embodiments.

As shown in FIG. 2, an index relation denoted by a dotted arrow 201 corresponds to the previous version of the installation file (second installation file) and an index relation indicated by a solid arrow 202 corresponds to the new version of the installation file (first installation file). It is only required to execute the switchover from the index relation denoted by 201 to the index relation indicated by 202. In accordance with embodiments of the present disclosure, the index relation between the description information layer 220 and the mapping information layer 230 and the index relation between the mapping information layer 230 and the data block layer 240 can be obtained in advance. Therefore, the upgrade can be fulfilled only by switching the index relation between the file system layer 210 and the description information layer 220.

During the above upgrade processing, the services on the nodes are temporarily suspended or migrated to other nodes because the description information layer 220 of the nodes to be upgraded will be switched. In accordance with embodiments of the present disclosure, the service is suspended or migrated depending on its timeout. For example, it is only required to migrate the service whose timeout is smaller than time costs of the installation. In fact, the conversion of the description information layer 220 is a rapid procedure, so the stress added onto other nodes will not last for a long time.

Furthermore, since the previous version of the installation file is conserved on the nodes, the nodes can roll back to the previous version of the installation file if the new version of the installation file cannot operate, such that the nodes will not be kept from work for a long time. In addition, installation time and occupied space can be saved because it is only required to load the incremental data block 270 and the corresponding information on the description information layer 220 and the mapping information layer 230 onto the respective nodes.

Figure 3:
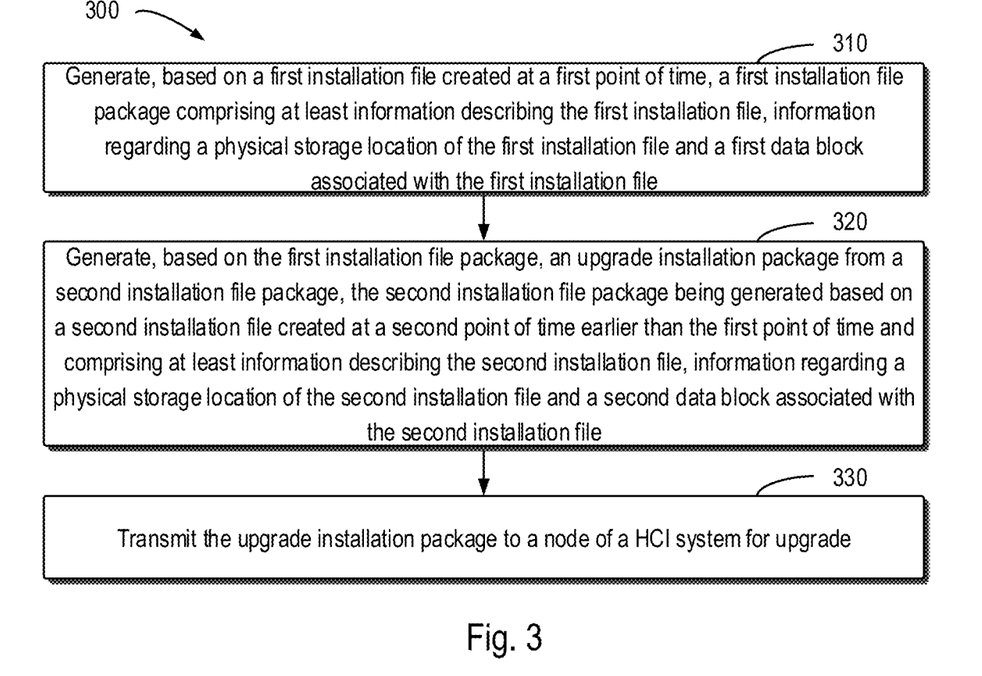
FIG. 3 illustrates a flowchart of a method of storage management in accordance with one embodiment of the present disclosure.

Based on the above concept and the hierarchical management of data, embodiments of the present disclosure provide a corresponding method of storage management, which will be described in details below with reference to FIGS. 3 to 7. FIG. 3 illustrates a flowchart of a method 300 of storage management in accordance with one embodiment of the present disclosure. The method 300 can be implemented at the server 120 of FIG. 1.

As shown in FIG. 3, at block 310, a first installation file package is generated based on a first installation file created at a first point of time. In accordance with embodiments of the present disclosure, the first installation file package at least includes information describing the first installation file, information regarding a physical storage location of the first installation file and a first data block associated with the first installation file (e.g., the first data block 250 shown in FIG. 2). For example, when a new version of the installation file developed by a developer is acquired, information describing the installation file, information regarding the physical storage location of the installation file and a data block associated with the installation file can be generated for the new version of the installation file. In addition, the information describing the installation file and the information regarding the physical storage location of the installation file are stored respectively in the description information layer 220 and the mapping information layer 230 of FIG. 2. Moreover, the first data block is not entirely stored in a storage space of the data block layer 240 and the details in this regard will be explained later.

At block 320, an upgrade installation package (e.g., the upgrade installation package 140 in FIG. 1) is generated from a second installation file package based on the first installation file package. The second installation file package is generated based on a second installation file created at a second point of time prior to the first point of time. In accordance with embodiments of the present disclosure, the second installation file at least includes information describing the second installation file, information regarding a physical storage location of the second installation file and a second data block (such as the second data block 260 of FIG. 2) associated with the second installation file. The second installation file actually corresponds to the previous version of the installation file mentioned above. It can be understood that the information describing the second installation file, the information regrading the physical storage location of the second installation file and the second data block associated with the second installation file have already been stored respectively into storage space of the descriptive information layer 220, the mapping information layer 230 and the data block layer 240 of FIG. 2. The second data block corresponds to the aforementioned basic data block.

In accordance with embodiments of the present disclosure, an incremental data block 270 of the first data block 250 relative to the second data block 260 is determined and the upgrade installation package 140 can be determined based on the incremental data block 270, the information describing the first installation file and the information regarding the physical storage location of the first installation file. In accordance with embodiments of the present disclosure, the upgrade installation package 140 at least can include the incremental data block 270, the information describing the first installation file and the information regarding the physical storage location of the first installation file.

Figure 4:
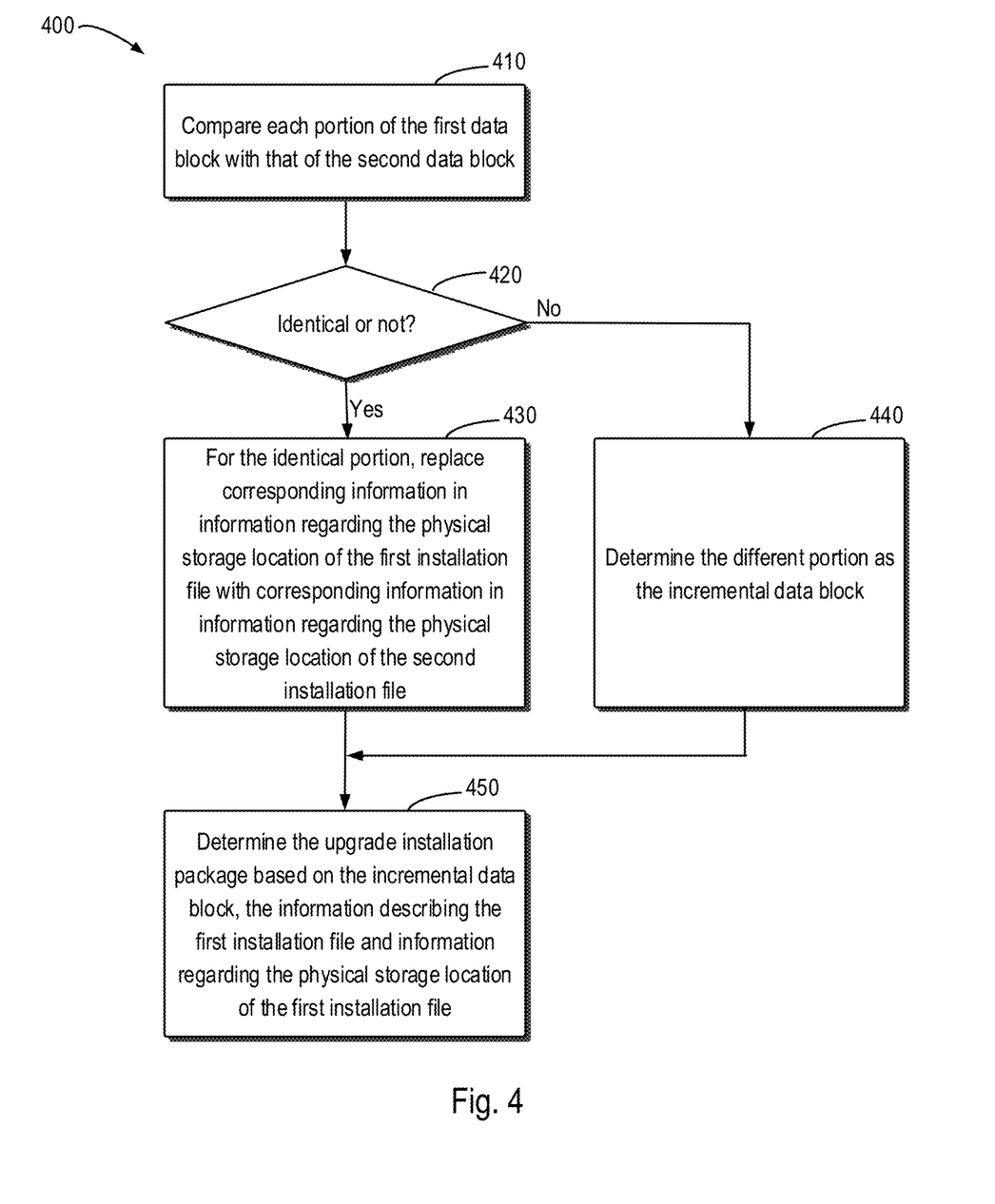
FIG. 4 illustrates a flowchart of an example method for generating an upgrade installation package in accordance with embodiments of the present disclosure.

FIG. 4 illustrates a flowchart of an example method 400 for generating an upgrade installation package in accordance with embodiments of the present disclosure. The method 400 also can be implemented at the server 120 of FIG. 1.

As shown in FIG. 4, the first data block 250 is compared with the second data block 260 in portions at block 410. The comparison granularity (i.e., the size of each portion) can be determined as needed and embodiments of the present disclosure are not restricted in this regard.

It is determined, at block 420, whether corresponding portions under comparison are identical. If yes, the method proceeds to block 430, at which corresponding information in the information regarding the physical storage location of the first installation file is replaced by corresponding information in the information regarding the physical storage location of the second installation file for the identical portion. In other words, the mapping information of the new version of the installation file in the mapping information layer 230 points to a corresponding portion in the second data block 260.

If the corresponding portions are different, the method proceeds to block 440, at which the different portion is determined as a portion of the incremental data block. In accordance with embodiments of the present disclosure, corresponding storage space is allocated for the different portion in the data block layer 240, the different portion is stored into the allocated storage space and the corresponding information in the information regarding the physical storage location of the first installation file is updated with the physical storage location information corresponding to the allocated storage space.

By comparing each portion of the first data block 250 with that of the second data block 260 one by one through the operations of blocks 410 to 440, the incremental data block 270 can be determined and the information regarding the physical storage location of the first installation file can be correspondingly updated. At block 450, the upgrade installation package 140 can be determined based on the determined incremental data block 270, the information describing the first installation file and the updated information related to the physical storage location of the first installation file.

With reference to FIG. 3, upon the upgrade installation package 140 is generated, the method enters to block 330 to transmit the upgrade installation package 140 to a node of the HCI system (e.g., respective nodes 111, 112, 113 of the HCI system 110 in FIG. 1) for use in upgrade. In accordance with embodiments of the present disclosure, the upgrade installation package can be actively transmitted to the respective nodes by the server 120. In accordance with alternative embodiments of the present disclosure, the upgrade installation package can be transmitted by the server 120 in response to a request for upgrade from the nodes.

The solution of storage management implemented at the server 120 has been described. In this solution, the installation time and the occupied space can be saved by generating an upgrade installation package including the incremental data block instead of the entire data block. Correspondingly, embodiments of the present disclosure also provide a solution of storage management implemented at the respective nodes 111, 112, 113 of the HCI system 110. The details will be described below with reference to FIGS. 5 to 7.

Figure 5:
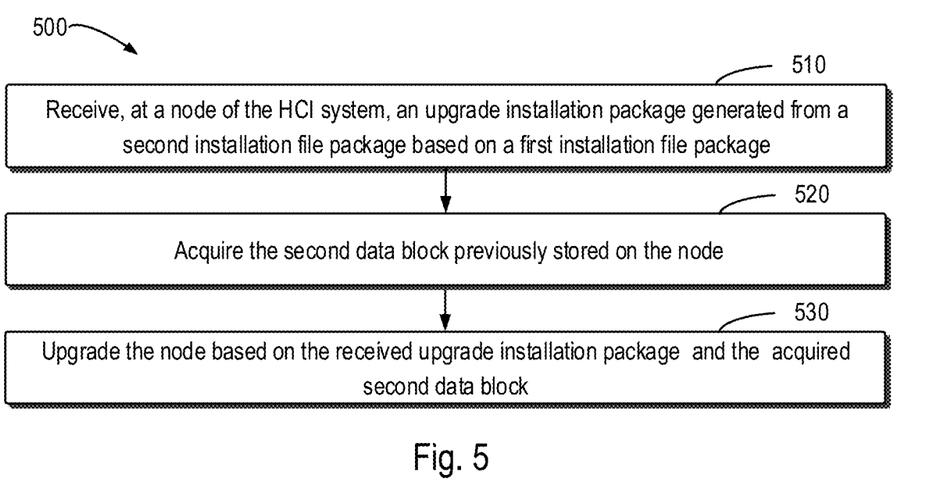
FIG. 5 illustrates a flowchart of a method of storage management in accordance with another embodiment of the present disclosure.

FIG. 5 illustrates a flowchart of a method 500 of storage management in accordance with another embodiment of the present disclosure. The method 500 can be implemented at the respective nodes 111, 112, 113 of the HCI system 110 in FIG. 1. As shown in FIG. 5, an upgrade installation package (e.g., the upgrade installation package 140 of FIG. 1) can be received at the respective nodes at block 510. The upgrade installation package is generated from the second installation file package based on the first installation file package as described above with reference to FIGS. 3 and 4. The first installation file package is generated based on the first installation file created at the first point of time and the second installation file package is generated based on the second installation file created at the second point of time prior to the first point of time.

In accordance with embodiments of the present disclosure, the upgrade installation package 140 at least can include the incremental data block 270, the information describing the first installation file (also known as description information) and the information related to the physical storage location of the first installation file (also known as mapping information), wherein the incremental data block 270 is an incremental data block of the first data block 250 relative to the second data block 260. Other details of the upgrade installation package 140 can refer to the above related descriptions with reference to FIGS. 2 to 4 and will not be repeated here.

The second data block previously stored on the node is acquired at block 520. As mentioned above, the previous version of the installation file (here, the second installation file) will be conserved on the respective nodes, wherein the previous version of the installation file includes the information describing the installation file, the information regarding the physical storage location of the installation file and the data block associated with the installation file (here, the second data block). The second data block acts as the basic data block for subsequent upgrade.

At block 530, the node is upgraded based on the received upgrade installation package and the acquired second data block. In accordance with embodiments of the present disclosure, the installation file can be executed based on description information and mapping information related to the new version of the installation file and the incremental data block relative to the second data block in the upgrade installation file package and based on the second data block already stored on the node, to implement upgrade. More details will be provided below with reference to FIG. 6.

Figure 6:
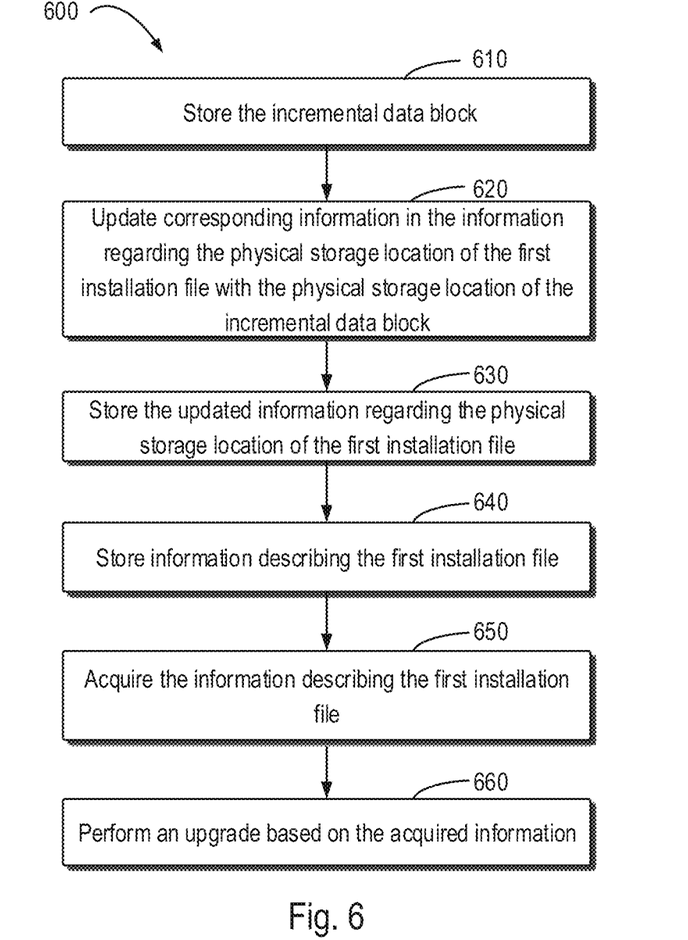
FIG. 6 illustrates a flowchart of a method of storage management in accordance with a further embodiment of the present disclosure.

FIG. 6 illustrates a flowchart of a method 600 of storage management in accordance with a further embodiment of the present disclosure. The method 600 also can be implemented at the respective nodes 111, 112 and 113 of the HCI system 110. As shown in FIG. 6, upon the upgrade installation package is received, the incremental data block 270 can be stored at block 610. In accordance with embodiments of the present disclosure, the node can allocate, in the data block layer 240, a storage space to the incremental data block 270 and store it in the allocated storage space.

At block 620, the corresponding information in the information regarding the physical storage location of the first installation file is updated with the physical storage location of the incremental data block 270. For example, the corresponding information in the mapping information of the upgrade installation file 140 can be replaced with the physical storage location information corresponding to the allocated storage space.

At block 630, the updated information regarding the physical storage location of the first installation file is stored.

In accordance with embodiments of the present disclosure, the node can store the mapping information into a storage space corresponding to the mapping information layer 230 maintained at the node side. At block 640, the information describing the first installation file is stored. In accordance with embodiments of the present disclosure, the nodes can store the description information in the upgrade installation package 140 directly into the storage space corresponding to the description information layer 230 maintained at the node side. It should be appreciated that the operations of the steps 610, 630 and 640 can be performed in any order and the present application is not restricted in this regard.

When the nodes are upgraded, operations of blocks 650 and 660 are performed. At block 650, the information describing the first installation file is acquired. In accordance with embodiments of the present disclosure, the information describing the first installation file corresponding to the upgraded version can be determined from the description information layer 220. In accordance with embodiments of the present disclosure, the determined information describing the first installation file is stored in a predetermined storage space in the description information layer 220, at which the execution of the installation file will be started.

At block 650, the upgrade is performed based on the information describing the first installation file. In accordance with embodiments of the present disclosure, a logical storage location of the first installation file can be determined from the information describing the first installation file. The logical storage location is a storage location of the mapping information of the first installation file in the mapping information layer 230. The physical storage location of the data block associated with the first installation file can be determined from the logical storage location. The physical storage location is the storage location of the data block of the first installation file in the data block layer 240. The physical storage location may relate to the second data block originally stored on the node, and also may relate to the incremental data block obtained by receiving the upgrade installation package. Accordingly, all data blocks associated with the first installation file can be acquired from the storage disk based on the physical storage location, so as to execute the installation file to implement upgrade.

With the solutions of FIGS. 5 and 6, due to the hierarchical management of data and the use of the incremental data block, the upgrade can be performed by only storing a small amount of data blocks and the index information occupying a small space (e.g., description information and mapping information) and acquiring (also known as switchover) the information describing the installation file corresponding to the version to be upgraded. Accordingly, the upgrade can be performed under the temporary migration service or without the migration service (suspending the service only), which will not cause too much influence on other nodes.

Furthermore, the previous version of the installation file is stored on the nodes such that the nodes can continue to operate on the previous version without interrupting the service in case that the upgrade fails. The details are described below with reference to FIG. 7, which illustrates a flowchart of a method 700 of storage management in accordance with a still further embodiment of the present disclosure. The method 700 can be implemented at the respective nodes 111, 112 and 113 in the HCI system of FIG. 1.

Figure 7:
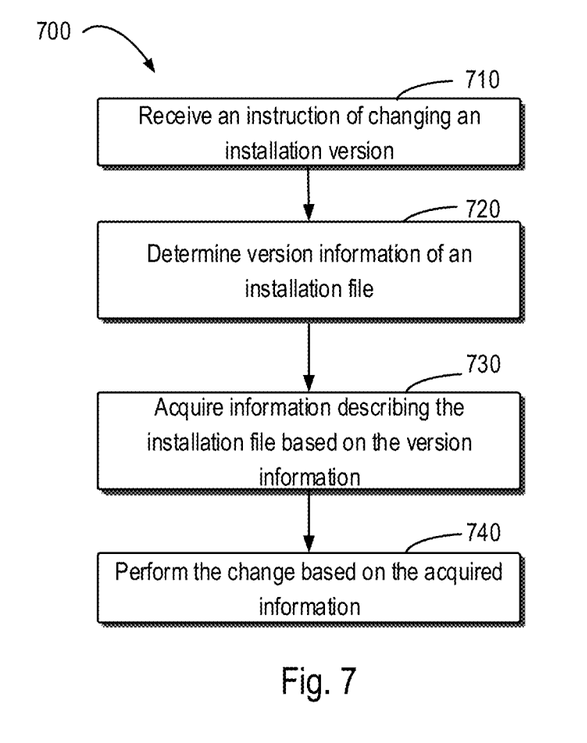
FIG. 7 illustrates a flowchart of a method of storage management in accordance with a still further embodiment of the present disclosure.

As shown in FIG. 7, at block 710, an instruction of changing an installed version is received. In accordance with some embodiments of the present disclosure, the node can change the installed version in response to failure of the installation of the new version. In this case, the instruction of changing the installed version corresponds to the failure of the installation of the new version. In accordance with alternative embodiments of the present disclosure, the node can perform the change of the installed version in response to an instruction from a user.

At block 720, version information of an installation file is determined. In accordance with embodiments of the present disclosure, the version information to which the installed version is changed can be obtained from the received instruction. In accordance with embodiments of the present disclosure, the version information for changing can be preset. It should be understood that the present application is not restricted to the listed embodiments and any other suitable manners also can exist.

At block 730, information describing the installation file is acquired based on the determined version information. In accordance with embodiments of the present disclosure, the node can look up, from the description information layer 220, the information describing the installation file corresponding to the determined version information. The operation of this step is similar to the operation of the block 650 described with reference to FIG. 6. At block 740, the change of the installed version is performed based on the acquired information describing the installation file. The operation of this step is similar to the operation of the block 660 described with reference to FIG. 6.

With the method of FIG. 7, the change of the installed version can be implemented without performing the reinstallation, which accordingly can ensure that the node always operates normally without interrupting the services.

Figure 8:
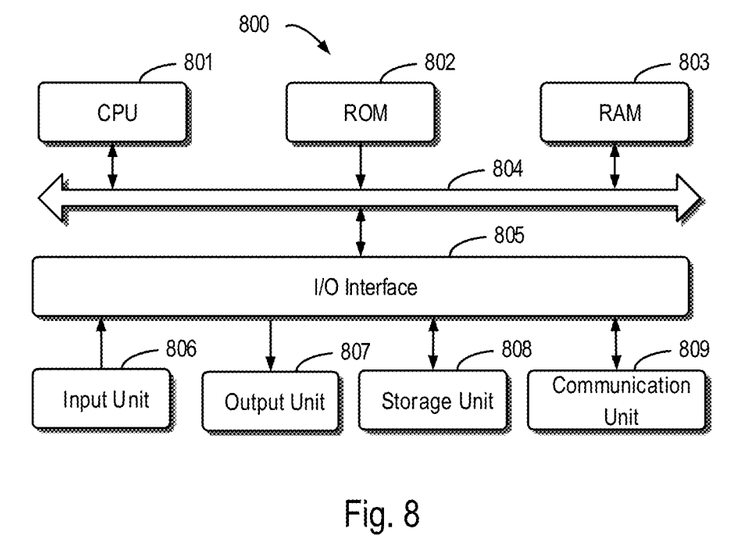
FIG. 8 illustrates a schematic block diagram of a device suitable for implementing embodiments of the present disclosure.

FIG. 8 illustrates a schematic block diagram of an example computing device 800 for implementing embodiments of the present disclosure. The device 800 can be used for implementing the methods in combination with FIGS. 3 to 7. As shown, the device 800 includes a central process unit (CPU) 801, which can execute various suitable actions and processing based on the computer program instructions stored in a read-only memory (ROM) 802 or computer program instructions loaded in a random-access memory (RAM) 803 from a storage unit 808. The RAM 803 can also store all kinds of programs and data required by the operations of the device 800. The CPU 801, ROM 802 and RAM 803 are connected to each other via a bus 804. An input/output (I/O) interface 805 is also connected to the bus 804.

A plurality of components in the device 800 is connected to the I/O interface 805, including: an input unit 806, such as keyboard, mouse and the like; an output unit 807, e.g., various kinds of display and loudspeakers etc.; a storage unit 808, such as storage and optical disk etc.; and a communication unit 809, such as network card, modem, wireless transceiver and the like. The communication unit 809 allows the device 800 to exchange information/data with other devices via the computer network, such as Internet, and/or various telecommunication networks.

The processing unit 801 executes above described respective methods and processing, such as the methods 300 to 700. For example, in some embodiments, the methods 300 to 700 can be implemented as computer software program tangibly included in the machine-readable medium, e.g., the storage unit 808. In some embodiments, the computer program can be partially or fully loaded and/or mounted to the device 800 via the ROM 802 and/or communication unit 809. When the computer program is loaded to the RAM 803 and executed by the CPU 801, one or more steps of the above described the methods 300 to 700 can be implemented. Alternatively, in other embodiments, the CPU 801 also can be configured via any other suitable ways (e.g., by means of firmware) to execute the methods 300 to 700.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a peer machine or entirely on the peer machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed by way of example.

We claim:

1. A method of storage management, comprising:
    generating, based on a first installation file created at a first point of time, a first installation file package comprising at least information describing the first installation file corresponding to a description information layer, information regarding a physical storage location of the first installation file corresponding to a mapping information layer, and a first data block associated with the first installation file corresponding to a data block layer, the first installation file corresponding to a first index relation between files in a file system layer and the information describing the first installation file corresponding to the description information layer;

generating an upgrade installation package from a second installation file package based on the first installation file package, the second installation file package being generated based on a second installation file created at a second point of time prior to the first point of time, and the second installation file package comprising at least information describing the second installation file corresponding to the description information layer, information regarding a physical storage location of the second installation file corresponding to the mapping information layer, and a second data block associated with the second installation file corresponding to the data block layer, the second installation file corresponding to a second index relation between the files in the file system layer and the information describing the second installation file corresponding to the description information layer;

transmitting the upgrade installation package to a node of a hyper-converged infrastructure (HCI) system for upgrade;

allocating storage space in the data block layer for an incremental data block of the first data block relative to the second data block;

updating the information regarding the physical storage location of the first installation file with a physical storage location of the allocated storage space for the incremental data block;

storing the updated information regarding the physical storage location of the first installation file in storage space corresponding to the mapping information layer;

storing the information describing the first installation file in storage space corresponding to the description information layer; and performing the upgrade on the node of the HCI system by executing a first switchover from the second index relation corresponding to the second installation file to the first index relation corresponding to the first installation file.

2. The method of claim 1, wherein generating the upgrade installation package comprises:
determining the incremental data block of the first data block relative to the second data block; and
determining the upgrade installation package based on the incremental data block, the information describing the first installation file, and the information regarding the physical storage location of the first installation file.

3. The method of claim 1, wherein:
the information describing the first installation file comprises at least a logical storage location of the first installation file, a size of the first installation file, a creation time of the first installation file, and version information of the first installation file; and
the information describing the second installation file comprises at least a logical storage location of the second installation file, a size of the second installation file, a creation time of the second installation file, and version information of the second installation file.

4. The method of claim 2, wherein determining the incremental data block comprises:
comparing the first data block with the second data block; and
determining a portion of the first data block that is different from the second data block as the incremental data block.

5. The method of claim 4, further comprising:
for a portion of the first data block that is identical to the second data block, replacing corresponding information in the information regarding the physical storage location of the first installation file with corresponding information in the information regarding the physical storage location of the second installation file.

6. A method of storage management, comprising:
receiving, at a node of a hyper-converged infrastructure (HCI) system, an upgrade installation package generated from a second installation file package based on a first installation file package, the first installation file package being generated based on a first installation file created at a first point of time and comprising at least information describing the first installation file corresponding to a description information layer, information regarding a physical storage location of the first installation file corresponding to a mapping information layer, and a first data block associated with the first installation file corresponding to a data block layer, and the second installation file package being generated based on a second installation file created at a second point of time prior to the first point of time and comprising at least information describing the second installation file corresponding to the description information layer, information regarding a physical storage location of the second installation file corresponding to the mapping information layer, and a second data block associated with the second installation file corresponding to the data block layer, the first installation file corresponding to a first index relation between files in a file system layer and the information describing the first installation file corresponding to the description information layer, the second installation file corresponding to a second index relation between the files in the file system layer and the information describing the second installation file corresponding to the description information layer;

acquiring the second data block previously stored on the node;

allocating storage space in the data block layer for an incremental data block of the first data block relative to the second data block;

updating the information regarding the physical storage location of the first installation file with a physical storage location of the allocated storage space for the incremental data block;

storing the updated information regarding the physical storage location of the first installation file in storage space corresponding to the mapping information layer;

storing the information describing the first installation file in storage space corresponding to the description information layer; and upgrading the node based on the received upgrade installation package and the acquired second data block, wherein the upgrading of the node of the HCI system includes executing a first switchover from the second index relation corresponding to the second installation file to the first index relation corresponding to the first installation file.

7. The method of claim 6, wherein the upgrade installation package at least comprises the incremental data block of the first data block relative to the second data block, the information describing the first installation file, and the information regarding the physical storage location of the first installation file.

8. The method of claim 6, wherein:
the information describing the first installation file comprises at least a logical storage location of the first installation file, a size of the first installation file, a creation time of the first installation file, and version information of the first installation file; and
the information describing the second installation file comprises at least a logical storage location of the second installation file, a size of the second installation file, a creation time of the second installation file, and version information of the second installation file.

9. The method of claim 6, wherein upgrading the node comprises:
acquiring the information describing the first installation file; and
performing an upgrade based on the information describing the first installation file.

10. The method of claim 6, further comprising:
in response to an instruction of changing an installed version, determining version information of an installation file;
acquiring information describing the installation file based on the version information; and
performing the change based on the acquired information.

11. An electronic device, comprising:
at least one processor;
a memory coupled to the at least one processor and having instructions stored thereon, the instructions, when executed by the at least one processor, causing the device to perform acts comprising:
generating, based on a first installation file created at a first point of time, a first installation file package comprising at least information describing the first installation file corresponding to a description information layer, information regarding a physical storage location of the first installation file corresponding to a mapping information layer, and a first data block associated with the first installation file corresponding to a data block layer, the first installation file corresponding to a first index relation between files in a file system layer and the information describing the first installation file corresponding to the description information layer;
generating an upgrade installation package from a second installation file package based on the first installation file package, the second installation file package being generated based on a second installation file created at a second point of time prior to the first point of time, and the second installation file package comprising at least information describing the second installation file corresponding to the description information layer, information regarding a physical storage location of the second installation file corresponding to the mapping information layer, and a second data block associated with the second installation file corresponding to the data block layer, the second installation file corresponding to a second index relation between the files in the file system layer and the information describing the second installation file corresponding to the description information layer;
transmitting the upgrade installation package to a node of a hyper-converged infrastructure (HCI) system for upgrade;
allocating storage space in the data block layer for an incremental data block of the first data block relative to the second data block;
updating the information regarding the physical storage location of the first installation file with a physical storage location of the allocated storage space for the incremental data block;
storing the updated information regarding the physical storage location of the first installation file in storage space corresponding to the mapping information layer;
storing the information describing the first installation file in storage space corresponding to the description information layer; and
performing the upgrade on the node of the HCI system by executing a first switchover from the second index relation corresponding to the second installation file to the first index relation corresponding to the first installation file.

12. The device of claim 11, wherein the memory further stores instructions which, when executed by the processor, cause the electronic device to:
determine the incremental data block of the first data block relative to the second data block; and
determine the upgrade installation package based on the incremental data block, the information describing the first installation file and the information regarding the physical storage location of the first installation file.

13. The device of claim 11, wherein:
the information describing the first installation file comprises at least a logical storage location of the first installation file, a size of the first installation file, a creation time of the first installation file, and version information of the first installation file; and
the information describing the second installation file comprises at least a logical storage location of the second installation file, a size of the second installation file, a creation time of the second installation file, and version information of the second installation file.

14. The device of claim 11, wherein the memory further stores instructions which, when executed by the processor, cause the electronic device to:
compare the first data block with the second data block; and
determine a portion of the first data block that is different from the second data block as the incremental data block.

15. The device of claim 14, wherein the memory further stores instructions which, when executed by the processor, cause the electronic device to:
for a portion of the first data block that is identical to the second data block, replace corresponding information in the information regarding the physical storage location of the first installation file with corresponding information in the information regarding the physical storage location of the second installation file.

16. An electronic device, comprising:
at least one processor;
a memory coupled to the at least one processor and having instructions stored thereon, the instructions, when executed by the at least one processor, causing the device to perform acts comprising:
receiving, at a node of a hyper-converged infrastructure (HCI) system, an upgrade installation package generated from a second installation file package based on a first installation file package, the first installation file package being generated based on a first installation file created at a first point of time and comprising at least information describing the first installation file corresponding to a description information layer, information regarding a physical storage location of the first installation file corresponding to a mapping information layer, and a first data block associated with the first installation file corresponding to a data block layer, and the second installation file package being generated based on a second installation file created at a second point of time prior to the first point of time and comprising at least information describing the second installation file corresponding to the description information layer, information regarding a physical storage location of the second installation file corresponding to the mapping information layer, and a second data block associated with the second installation file corresponding to the data block layer, the first installation file corresponding to a first index relation between files in a file system layer and the information describing the first installation file corresponding to the description information layer, the second installation file corresponding to a second index relation between the files in the file system layer and the information describing the second installation file corresponding to the description information layer;

acquiring the second data block previously stored on the node;

allocating storage space in the data block layer for an incremental data block of the first data block relative to the second data block;

updating the information regarding the physical storage location of the first installation file with a physical storage location of the allocated storage space for the incremental data block;

storing the updated information regarding the physical storage location of the first installation file in storage space corresponding to the mapping information layer;

storing the information describing the first installation file in storage space corresponding to the description information layer; and upgrading the node based on the received upgrade installation package and the acquired second data block, wherein the upgrading of the node of the HCI system includes executing a first switchover from the second index relation corresponding to the second installation file to the first index relation corresponding to the first installation file.

17. The device of claim 16, wherein the upgrade installation package at least comprises the incremental data block of the first data block relative to the second data block, the information describing the first installation file and the information regarding the physical storage location of the first installation file.

18. The device of claim 16, wherein:
the information describing the first installation file comprises at least a logical storage location of the first installation file, a size of the first installation file, a creation time of the first installation file, and version information of the first installation file; and
the information describing the second installation file comprises at least a logical storage location of the second installation file, a size of the second installation file, a creation time of the second installation file, and version information of the second installation file.

19. The device of claim 16, wherein the memory further stores instructions which, when executed by the processor, cause the electronic device to:
acquire the information describing the first installation file; and
perform an upgrade based on the information describing the first installation file.

20. The device of claim 16, wherein the memory further stores instructions which, when executed by the processor, cause the electronic device to:
in response to an instruction of changing an installed version, determine version information of an installation file;
acquire information describing the installation file based on the version information; and
perform the change based on the acquired information.

21. A computer program product having a non-transitory computer readable medium which stores a set of instructions to perform storage management; the set of instructions, when carried out by computerized circuitry, causing the computerized circuitry to perform a method of:
generating, based on a first installation file created at a first point of time, a first installation file package comprising at least information describing the first installation file corresponding to a description information layer, information regarding a physical storage location of the first installation file corresponding to a mapping information layer, and a first data block associated with the first installation file corresponding to a data block layer, the first installation file corresponding to a first index relation between files in a file system layer and the information describing the first installation file corresponding to the description information layer;

generating an upgrade installation package from a second installation file package based on the first installation file package, the second installation file package being generated based on a second installation file created at a second point of time prior to the first point of time, and the second installation file package comprising at least information describing the second installation file corresponding to the description information layer, information regarding a physical storage location of the second installation file corresponding to the mapping information layer, and a second data block associated with the second installation file corresponding to the data block layer, the second installation file corresponding to a second index relation between the files in the file system layer and the information describing the second installation file corresponding to the description information layer;

transmitting the upgrade installation package to a node of a hyper-converged infrastructure (HCI) system for upgrade;

allocating storage space in the data block layer for an incremental data block of the first data block relative to the second data block;

updating the information regarding the physical storage location of the first installation file with a physical storage location of the allocated storage space for the incremental data block;

storing the updated information regarding the physical storage location of the first installation file in storage space corresponding to the mapping information layer;

storing the information describing the first installation file in storage space corresponding to the description information layer; and performing the upgrade on the node of the HCI system by executing a first switchover from the second index relation corresponding to the second installation file to the first index relation corresponding to the first installation file.

22. A computer program product having a non-transitory computer readable medium which stores a set of instructions to perform storage management; the set of instructions, when carried out by computerized circuitry, causing the computerized circuitry to perform a method of:

receiving, at a node of a hyper-converged infrastructure (HCI) system, an upgrade installation package generated from a second installation file package based on a first installation file package, the first installation file package being generated based on a first installation file created at a first point of time and comprising at least information describing the first installation file corresponding to a description information layer, information regarding a physical storage location of the first installation file corresponding to a mapping information layer, and a first data block associated with the first installation file corresponding to a data block layer, and the second installation file package being generated based on a second installation file created at a second point of time prior to the first point of time and comprising at least information describing the second installation file corresponding to the description information layer, information regarding a physical storage location of the second installation file corresponding to the mapping information layer, and a second data block associated with the second installation file corresponding to the data block layer, the first installation file corresponding to a first index relation between files in a file system layer and the information describing the first installation file corresponding to the description information layer, the second installation file corresponding to a second index relation between the files in the file system layer and the information describing the second installation file corresponding to the description information layer;

acquiring the second data block previously stored on the node;

allocating storage space in the data block layer for an incremental data block of the first data block relative to the second data block;

updating the information regarding the physical storage location of the first installation file with a physical storage location of the allocated storage space for the incremental data block;

storing the updated information regarding the physical storage location of the first installation file in storage space corresponding to the mapping information layer;

storing the information describing the first installation file in storage space corresponding to the description information layer; and upgrading the node based on the received upgrade installation package and the acquired second data block, wherein the upgrading of the node of the HCI system includes executing a first switchover from the second index relation corresponding to the second installation file to the first index relation corresponding to the first installation file.

* * * * *